United States Patent
Koo (10) Patent No.: US 12,202,475 B2
(45) Date of Patent: Jan. 21, 2025

(54) APPARATUS AND METHOD FOR ASSISTING DRIVING OF VEHICLE

(71) Applicant: HL Klemove Corp., Incheon (KR)

(72) Inventor: Bonill Koo, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 245 days.

(21) Appl. No.: 17/730,482

(22) Filed: Apr. 27, 2022

(65) Prior Publication Data

US 2022/0348199 A1 Nov. 3, 2022

(30) Foreign Application Priority Data

Apr. 28, 2021 (KR) .................. 10-2021-0055234

(51) Int. Cl.
| | | |
|---|---|---|
| *B60W 30/12* | (2020.01) | |
| *B60W 30/18* | (2012.01) | |
| *B60W 50/029* | (2012.01) | |
| *G01S 17/88* | (2006.01) | |
| *G06V 20/56* | (2022.01) | |

(52) U.S. Cl.
CPC ...... *B60W 30/12* (2013.01); *B60W 30/18009* (2013.01); *B60W 50/029* (2013.01); *G01S 17/88* (2013.01); *G06V 20/588* (2022.01); *B60W 2420/403* (2013.01); *B60W 2420/408* (2024.01); *B60W 2552/53* (2020.02); *B60W 2556/40* (2020.02); *B60W 2556/50* (2020.02)

(58) Field of Classification Search
CPC .......... B60W 30/12; B60W 30/18009; B60W 50/029; B60W 2420/403; B60W 2420/408; B60W 2552/53; B60W 2556/40; B60W 2556/50; B60W 40/06; B60W 40/10; G01S 17/88; G01S 7/4802; G01S 17/86; G01S 17/931; G01S 19/24; G06V 20/588; G06V 20/582; G06V 10/803; G60V 20/584; H04N 7/18; B60Y 2300/12; H02N 23/57
USPC .......................................................... 701/41
See application file for complete search history.

(56) References Cited

U.S. PATENT DOCUMENTS

2020/0193174 A1* 6/2020 Machii ................ G06V 20/588
2020/0312052 A1* 10/2020 Bonnevay ............. H04N 23/67

FOREIGN PATENT DOCUMENTS

| KR | 10-2015-0025714 A | 3/2015 |
| KR | 10-2018-0025591 A | 3/2018 |
| KR | 10-2018-0070385 A | 6/2018 |
| KR | 10-2020-0016949 A | 2/2020 |
| KR | 10-2020-0133861 A | 12/2020 |
| KR | 10-2021-0003386 A | 1/2021 |

OTHER PUBLICATIONS

KR OA dated Jun. 17, 2024.

* cited by examiner

*Primary Examiner* — Yi-Kai Wang
(74) *Attorney, Agent, or Firm* — Harvest IP Law, LLP

(57) ABSTRACT

Disclosed is an apparatus for assisting driving of a vehicle including a camera provided in the vehicle, a lidar sensor provided in the vehicle, and a controller configured to control the vehicle to prevent to deviate from a lane based on lane information obtained by the camera and the lidar sensor, wherein the controller excludes the lane information obtained by the camera and controls the vehicle to prevent to deviate from the lane based on the lane information obtained by the lidar sensor, when the vehicle enters a tunnel.

23 Claims, 8 Drawing Sheets

APPARATUS AND METHOD FOR ASSISTING DRIVING OF VEHICLE

CROSS-REFERENCE TO RELATED APPLICATION(S)

This application is based on and claims priority under 35 U.S.C. § 119 to Korean Patent Application No. 10-2021-0055234, filed on Apr. 28, 2021, in the Korean Intellectual Property Office, the disclosure of which is incorporated by reference herein in its entirety.

BACKGROUND

1. Field

The disclosure relates to an apparatus and method for assisting driving of a vehicle, and more particularly, an apparatus and method for assisting driving of a vehicle capable of excluding lane information obtained by a camera depending on a vehicle surrounding environment and controlling driving by using lane information obtained by a lidar sensor.

2. Description of the Related Art

A vehicle refers to a device capable of transporting people or goods to a destination while traveling on a road or track. The vehicle may move to various positions mainly by using one or more wheels installed on the vehicle body. Such a vehicle may include a three-wheeled or four-wheeled vehicle, a two-wheeled vehicle such as a motorcycle, a construction machine, a bicycle, and a train running on rails disposed on a track.

Recently, in order to reduce the burden on a driver and increase convenience, research on a vehicle equipped with an advanced driver assist system (ADAS) that actively provides information on a vehicle state, a driver state, and a surrounding environment is being actively conducted.

Furthermore, in recent years, vehicles capable of lane keeping assist (LKA) and lane following assist (LFA) capable of maintaining a lane of the vehicle by equipping the vehicle with a camera have been developed.

SUMMARY

It is an aspect of the disclosure to provide an apparatus and method for assisting driving of a vehicle capable of increasing accuracy of LKA and LFA by determining whether to use all lane information obtained by a camera and a lidar sensor or only lane information obtained by the lidar sensor, depending on a vehicle surrounding environment.

Additional aspects of the disclosure will be set forth in part in the description which follows and, in part, will be obvious from the description, or may be learned by practice of the disclosure.

In accordance with an aspect of the disclosure, an apparatus for assisting driving of a vehicle includes a camera provided in the vehicle, a lidar sensor provided in the vehicle, and a controller configured to control the vehicle to prevent to deviate from a lane based on lane information obtained by the camera and the lidar sensor, wherein the controller excludes the lane information obtained by the camera and controls the vehicle to prevent to deviate from the lane based on the lane information obtained by the lidar sensor, when the vehicle enters a tunnel.

In accordance with another aspect of the disclosure, an apparatus for assisting driving of a vehicle includes a camera provided in the vehicle, a lidar sensor provided in the vehicle, and a controller configured to control the vehicle to prevent to deviate from a lane based on lane information obtained by the camera and the lidar sensor, wherein the controller excludes the lane information obtained by the camera and controls the vehicle to prevent to deviate from the lane based on the lane information obtained by the lidar sensor, when a degree of contamination of the camera is equal to or greater than a reference degree of contamination.

In accordance with another aspect of the disclosure, a method for assisting driving of a vehicle includes controlling the vehicle to prevent to deviate from a lane based on lane information obtained by a camera and a lidar sensor, and excluding the lane information obtained by the camera and controlling the vehicle to prevent to deviate from the lane based on the lane information obtained by the lidar sensor, when the vehicle enters a tunnel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numbers refer to like elements throughout this specification. This specification does not describe all components of the embodiments, and general contents in the technical field to which the disclosure belongs or overlapping contents between the embodiments will not be described. The terms "part," "module," "member," and "block" as used herein, may be implemented as software or hardware, and according to embodiments, a plurality of "parts," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

It will be understood that although the terms first, second, etc. may be used herein to describe various components, these components should not be limited by these terms, and the terms are only used to distinguish one component from another.

The singular expressions herein may include plural expressions, unless the context clearly dictates otherwise.

Reference numerals used in operations are provided for convenience of description, without describing the order of the operations, and the operations may be executed in a different order from the stated order unless a specific order is definitely specified in the context.

In the disclosure, a "driving lane" may refer to a lane in which an own vehicle is traveling.

Hereinafter, a principle of action and embodiments of the disclosure will be described with reference to the accompanying drawings.

Figure 1:
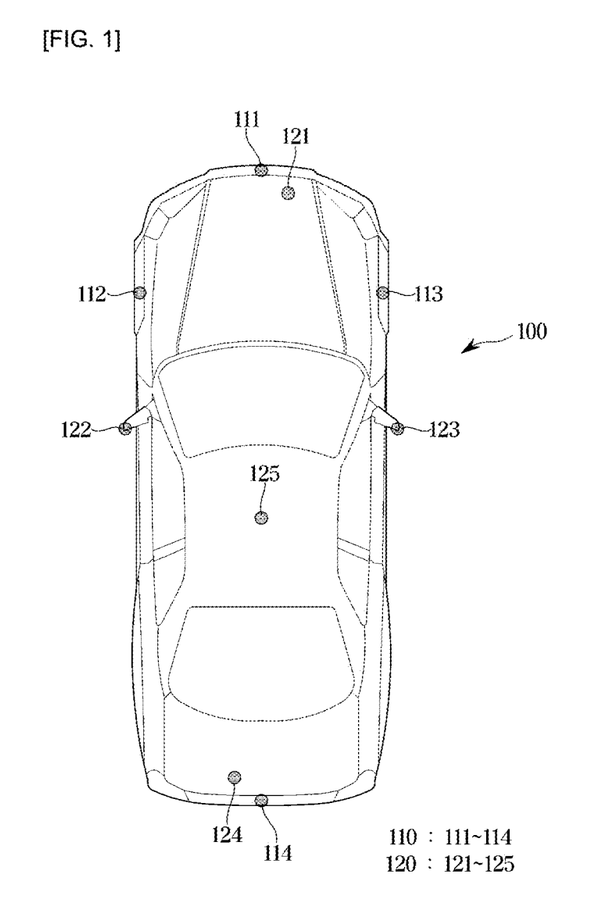
FIG. 1 is an aerial view illustrating an exterior of a vehicle according to an embodiment.

FIG. 1 is an aerial view illustrating an exterior of a vehicle according to an embodiment.

Referring to FIG. 1, a vehicle 100 may include a camera 110 and a lidar sensor 120. In this case, the camera 110 of the vehicle 100 may include one or more camera sensors 111 to 114 provided in the vehicle 100. The lidar sensor 120 of the vehicle 100 may include one or more lidar sensors 121 to 125 provided in the vehicle 100.

The camera 110 may obtain an image of an object and provide image data to various components in the vehicle 100. That is, the camera 110 may obtain information on lanes around the vehicle 100 and transmit the lane information to the controller 150.

The camera 110 may be the camera sensors 111 to 114 provided at the front, sides, and rear of the vehicle 100. The camera sensors 111 to 114 provided at the front, sides, and rear of the vehicle 100 may be used to analyze images around the vehicle 100 or to identify a driving state of the vehicle 100.

The lidar sensor 120 refers to a detection sensor capable of knowing a distance, direction, altitude, speed, etc. of an object by irradiating a laser (for example, infrared, visible light, etc.) having a shorter wavelength than electromagnetic waves and receiving light reflected from the object. The lidar sensor 120 may include a light source provided to transmit a laser and a receiver provided to receive reflected light.

The lidar sensor 120 may obtain a relative position, relative speed, etc. of a moving object (e.g., another vehicle, a pedestrian, a cyclist, etc.) around the vehicle 100. The lidar sensor 120 may also obtain a shape and location of a nearby fixed object (e.g., a lane, a budding, a sign, a traffic light, a bump, etc.).

That is, the lidar sensor 120 may obtain lane information by irradiating a laser to a lane around the vehicle 100 and receiving light reflected from the lane, and may provide lane information to the controller 150.

The lidar sensor 120 may be the one or more sensors 121 to 124 provided on the front, sides, and rear of the outside of the vehicle 100. The one or more sensors 121 to 124 provided on the front, sides, and rear of the outside of the vehicle 100 may detect a distance to an object around the vehicle 100.

The lidar sensor 120 may be a circular lidar sensor 125 provided on a roof of the vehicle 100. The circular lidar sensor 125 provided on the roof of the vehicle 100 may be used to collect 3D images around the vehicle 100, and may detect an object close to the vehicle 100 and a distance to the object.

Conventionally, lane keeping assist (LKA) and lane following assist (LFA) are performed based on lane information obtained by a camera sensor. In this case, the camera sensor may be affected by weather. For example, when the sunlight is too strong or snow covers the camera sensor, the camera sensor may not recognize a lane. Also, when the distance from the vehicle 100 to the lane is measured based on the information obtained by the camera sensor, the accuracy may be lower than when the lidar sensor 120 is used.

Therefore, it may be appropriate to perform LKA and LFA by also using the lane information obtained by the lidar sensor 120, rather than simply using the lane information obtained by the camera sensor.

Figure 2:
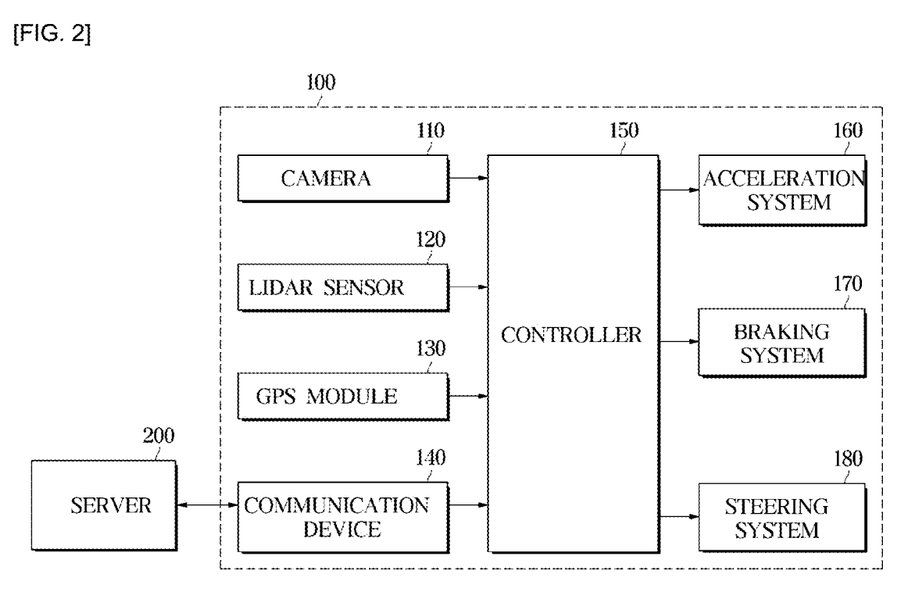
FIG. 2 is a control block diagram of the vehicle according to an embodiment.

FIG. 2 is a control block diagram of the vehicle according to an embodiment.

Referring to FIG. 2, a vehicle 100 according to an embodiment may include the camera 110, the lidar sensor 120, a GPS module 130, communication device 140, the controller 150, an acceleration system 160, a braking system 170, and a steering system 180.

The controller 150 may be provided to be separated from, for example, the camera 110 and/or the lidar sensor 120, The controller 150 may be installed in a housing separated from the camera 110 and/or the lidar sensor 120, and may exchange data with the camera 110 and/or the lidar sensor 120 through a communication network having a wide bandwidth. The controller 150 as described above may be variously referred to as an electronic control unit (ECU) or a domain control unit (DCU).

The controller 150 may provide various functions to the driver. For example, the controller 150 may provide lane keeping assist (LKA), lane following assist (LFA), lane departure warning (LDW), high beam assist (HBA), autonomous emergency braking (AEB), traffic sign recognition (TSR), smart cruise control (SCC), blind spot detection (BSD), and the like.

The controller 150 may process image data obtained from the camera 110 and detection data (lidar data) obtained from the lidar sensor 120, and may detect an environment of a road on which the vehicle 100 is traveling and a lane located on a side of the vehicle 100 in response to processing of the image data and the lidar data.

The acceleration system 160 may include an engine management system and an engine, the braking system 170 may include an electronic braking control module and a braking device, and the steering system 180 may include an electronic steering device and a steering device.

The controller 150 may control the vehicle 100 to prevent to deviate from a lane based on the lane information obtained by the camera 110 and the lidar sensor 120. Specifically, the controller 150 may control the vehicle 100 to prevent to deviate from a lane by controlling the acceleration system 160, the braking system 170, and the steering system 180.

For example, in order to prevent the vehicle 100 from invading on a neighboring lane, when a distance between the vehicle 100 and the lane is less than or equal to a preset distance, the controller 150 may control the acceleration system 160, the braking system 170, and the steering system 180 so that the vehicle 100 no longer approaches the lane.

As described above, even when the LKA and LFA are normally performed using the lane information obtained by the camera 110 and the lidar sensor 120, the camera 110 may not obtain the lane information.

For example, when an environment around the vehicle 100 darkens as the vehicle 100 enters the tunnel 300, the backlight illuminating the camera 110 is too strong, or snow or a dead leaf covers the camera 110, the camera 110 may not recognize a lane.

As such, when it is inappropriate to use the lane information obtained by the camera 110, the controller 150 may exclude the lane information obtained by the camera 110, and may control the vehicle 100 to prevent to deviate from the lane based on the lane information obtained by the lidar sensor 120.

A specific embodiment of a situation in which it is inappropriate to use the lane information obtained by the camera 110 will be described later with reference to FIGS. 3 to 6.

In order for the controller 150 of the vehicle 100 to perform fully autonomous driving, lateral information of the vehicle 100 needs to be grasped. Accordingly, the controller 150 may use information transmitted by the global position system (GPS) module 130.

The GPS module 130 may receive a satellite signal including navigation data from at least one global position system (GPS) satellite. The controller 150 may obtain the current location of the vehicle 100 and a traveling direction of the vehicle 100 based on the satellite signal.

The GPS module 130 may receive GPS information transmitted by the GPS satellite. When the GPS module 130 transmits GPS information to the controller 150, the controller 150 may calculate a distance between the satellite and a GPS receiver by comparing time information included in the GPS information transmitted by the GPS satellite with the time the GPS transmitter received the GPS information, and may determine the current location of the GPS module 130 based on the calculated distance. In this case, the controller 150 may represent the current location of the GPS module 130 as position coordinates on an absolute coordinate system. As such, the controller 150 of the vehicle 100 may generate location information of the vehicle 100 based on the received GPS information.

The communication device 140 may receive map information at the current location of the vehicle 100 from a server 200. In this case, the map information may, be information of a high-definition map, and the high-definition map may refer to a map including information such as traffic lights, signs, curbs, marks, and various structures in a three-dimensional digital form as well as lane unit information such as road center lines and boundary lines.

As such, the communication device 140 may transmit various signals and information to the server 200 through a wireless communication network, or may receive various signals and information from the server 200.

Herein, the wireless communication network refers to a communication network capable of transmitting and receiving signals wirelessly. The wireless communication network includes, but is not limited to, a 3G communication network, a 4G communication network, a 5G communication network, and the like.

The communication device 140 may transmit signals and information received from the server 200 to the controller 150.

The controller 150 may process GPS data obtained from the GPS module 130 and/or data obtained through the lidar sensor 120 and/or a high-definition map obtained through the communication device 140, may obtain lateral information of the vehicle 100 according to the processing result, and may control a behavior of the vehicle 100.

The controller 150 may include a processor and a memory. The processor may process image data of the camera 110 and lidar data of the lidar, and may generate a drive signal, a brake signal, and a steering signal for controlling the acceleration system 160, the braking system 170, and the steering system 180. For example, the processor may include an image processor to process image data of the camera 110 and/or a digital signal processor to process lidar data of the lidar and/or a micro control unit (MCU) to generate a driving signal, a braking signal, and a steering signal.

The memory may store a program and/or data for the processor to process image data, a program and/or data for processing radar data, and a program and/or data for the processor to generate a driving signal and/or a braking signal and/or a steering signal.

The memory may temporarily store image data received from the camera 110 and/or radar data received from a front radar, and may temporarily store the processing result of image data of the processor and/or radar data.

The memory may include a nonvolatile memory such as a flash memory, a read only memory (ROM), and an erasable programmable read only memory (EPROM) as well as a volatile memory such as S-RAM and D-RAM.

The above electronic components may communicate with each other through a vehicle communication network NT. For example, the electronic components may transmit and receive data through Ethernet, MOST (Media Oriented Systems Transport), Flexray, CAN (Controller Area Network), LIN (Local Interconnect Network), and the like.

Figure 3:
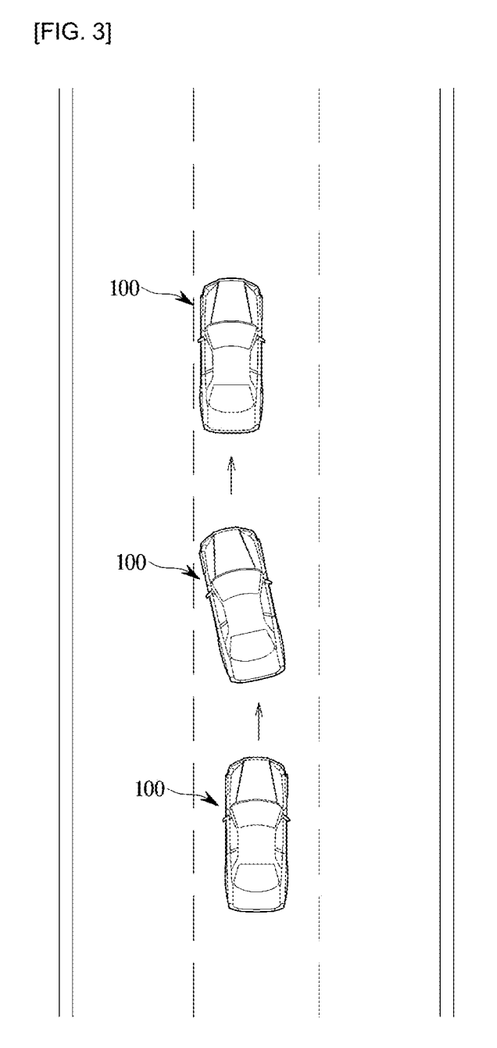
FIG. 3 illustrates that the vehicle drives without departing from a lane based on lane information according to an embodiment.
Figure 4:
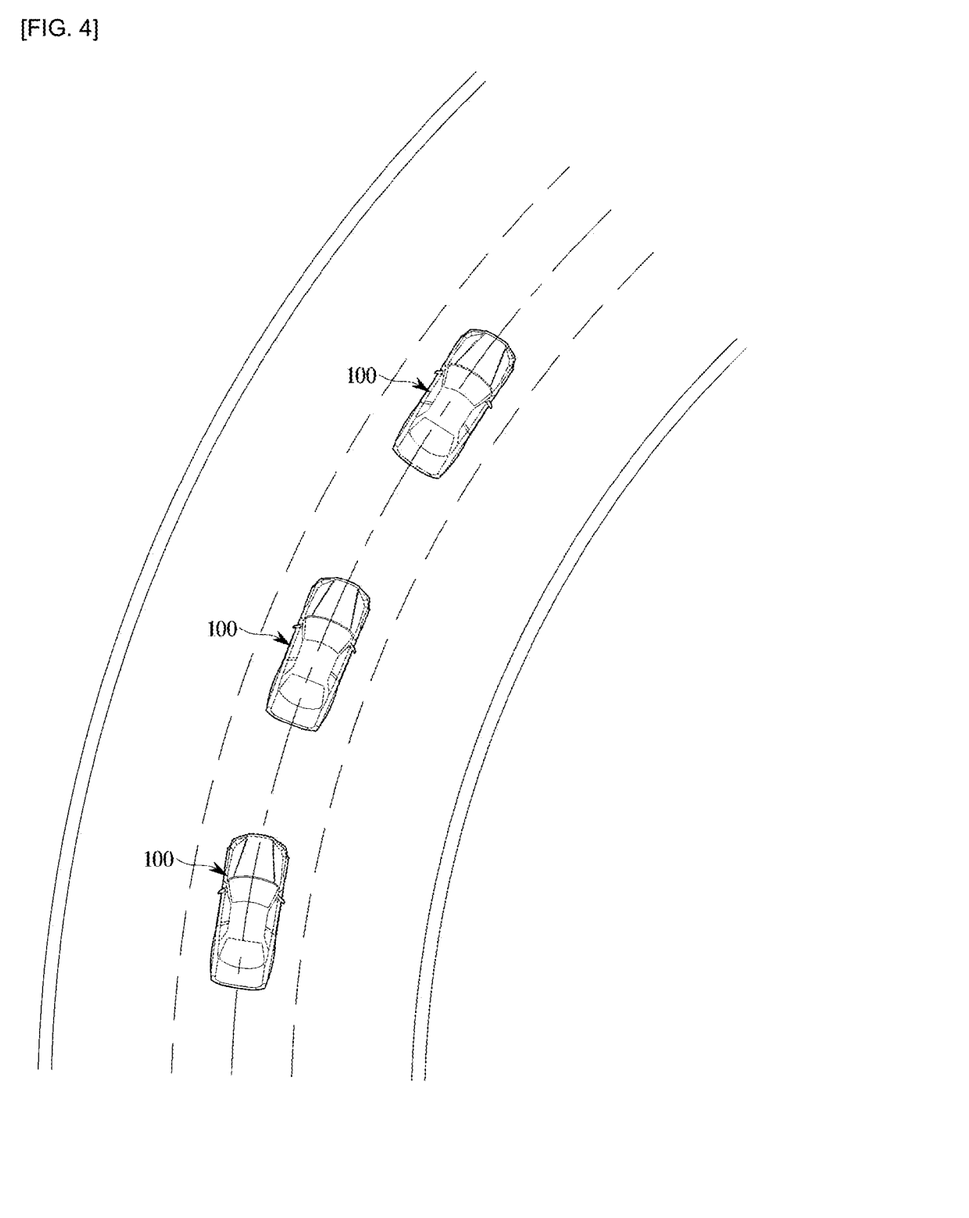
FIG. 4 illustrates that the vehicle drives along a center of a lane based on lane information according to an embodiment.

FIG. 3 illustrates that the vehicle drives without departing from a lane based on lane information according to an embodiment, and FIG. 4 illustrates that the vehicle drives along a center of a lane based on lane information according to an embodiment.

Referring to FIG. 3, the controller 150 may control the vehicle 100 to prevent to deviate from a lane based on the lane information obtained by the camera 110 and the lidar sensor 120.

Specifically, when the vehicle 100 driving along a center of a road approaches a left lane due to negligence of the driver, the controller 150 may control the acceleration system 160, the braking system 170, and the steering system 180 such that the vehicle 100 does not deviate from the left lane and invade a left road.

In this process, the controller 150 may know whether the vehicle 100 approaches the left lane based on the lane information obtained by the camera 110 and the lidar sensor 120.

While the vehicle 100 is driving, various contaminants may be attached to an external surface of the camera 110. For example, distortion of the image obtained by the camera 110 by rainwater, damage and contamination to the camera 110 by insects, covering the camera 110 by plastic bags and a dead leaf, covering the camera 110 by snow, contamination of the camera 110 by water splattered from a puddle, etc. may occur. When such contamination occurs, the camera 110 may not normally obtain lane information.

A degree of contamination may be a value indicating a degree to which a surface of the camera 110 is contaminated when the surface of the camera 110 is covered by contaminant outside the vehicle 100. For example, the degree of contamination may be a ratio of a surface area of the camera 110 covered with contaminant to a total area of the surface of the camera 110, but is not limited thereto.

The controller 150 may determine the degree of contamination of the camera 110 based on an image output value currently output by the camera 110 and a reference image output value.

The reference image output value may be an image output value output by the camera 110 when the surface of the camera 110 is not contaminated. The reference image output value may be a predetermined constant value. However, because the image output value output by the uncontaminated camera 110 may also continuously change when the vehicle 100 drives, the reference image output value may be a value that changes depending on a driving situation of the vehicle.

When a difference between an image output value currently output by the camera 110 and the reference image output value is greater than or equal to a predetermined value, this may be due to the camera 110 itself being damaged or the surface of the camera 110 being contaminated. In this case, the camera 110 may determine whether the camera 110 itself is damaged. When it is determined that the camera 110 itself is not damaged, the controller 150 may determine the degree of contamination of the camera 110 based on the image output value of the camera 110 and the reference image output value.

Specifically, when the surface of the camera 110 is covered and contaminated, the uncovered portion of the camera 110 may continue to obtain external information, but the covered portion may not be able to obtain external information. In this case, the image output value of the camera 110 may represent a value smaller than the reference image output value.

The controller 150 may determine a ratio of the current image output value of the camera 110 to the reference image output value as the degree of contamination.

A reference degree of contamination may be a degree of contamination that affects the performance of the camera 110. That is, the reference degree of contamination may be the degree of contamination that is a reference for determining whether to exclude the lane information obtained by the camera 110. The reference degree of contamination may be preset by a user, and a value of 10% may be suitable for the reference degree of contamination, but is not limited thereto.

When the degree of contamination of the camera 110 is equal to or greater than the reference degree of contamination, the controller 150 may exclude the lane information obtained by the camera 110, and may control the vehicle 100 to prevent to deviate from the lane based on the lane information obtained by the lidar sensor 120.

The camera 110 may not normally obtain lane information due to a strong backlight illuminating toward the camera 110 while the vehicle 100 is driving. For example, when a light source having a brightness greater than or equal to a reference brightness in image information obtained by the vehicle 100 exists, the camera 110 may not normally obtain lane information.

The reference brightness may be the brightness of a light source as a reference for determining whether to exclude the lane information obtained by the camera 110. The reference degree of contamination may be preset by the user.

When a light source having a brightness greater than or equal to the reference brightness in image information obtained by the camera 110 exists, the controller 150 may exclude the lane information obtained by the camera 110, and may control the vehicle 100 to prevent to deviate from the lane based on the lane information obtained by the lidar sensor 120.

Referring to FIG. 4, the controller 150 may control the vehicle 100 to drive along the center of the road based on the lane information obtained by the camera 110 and the lidar sensor 120.

Specifically, the controller 150 may control the vehicle 100 to drive along the center of the road by controlling the acceleration system 160, the braking system 170, and the steering system 180.

In this case, in order for the vehicle 100 to travel along the center of the lane, the controller 150 may control the acceleration system 160, the braking system 170, and the steering system 180 so that a distance between the vehicle 100 and a left lane of the vehicle 100 and a distance between the vehicle 100 and a right lane of the vehicle 100 are the same.

When a problem occurs that various types of contamination are attached to the external surface of the camera 110 while the vehicle 100 is driving, it may be appropriate to exclude the lane information obtained by the camera 110 and use the lane information obtained by the lidar sensor 120.

When the degree of contamination of the camera 110 is equal to or greater than the reference degree of contamination, the controller 150 may exclude the lane information obtained by the camera 110, and may control the vehicle 100 to travel along the center of the lane based on the lane information obtained by the lidar sensor 120.

In addition, when a problem occurs that the camera 110 may not normally obtain lane information due to a strong backlight illuminating toward the camera 110 while the vehicle 100 is driving, it may be appropriate to exclude the lane information obtained by the camera 110 and use the lane information obtained by the lidar sensor 120.

When a light source having a brightness greater than or equal to the reference brightness in the image information obtained by the camera 110 exists, the controller 150 may exclude the lane information obtained by the camera 110, and may control the vehicle 100 to travel along the center of the lane based on the lane information obtained by the lidar sensor 120.

Figure 5:
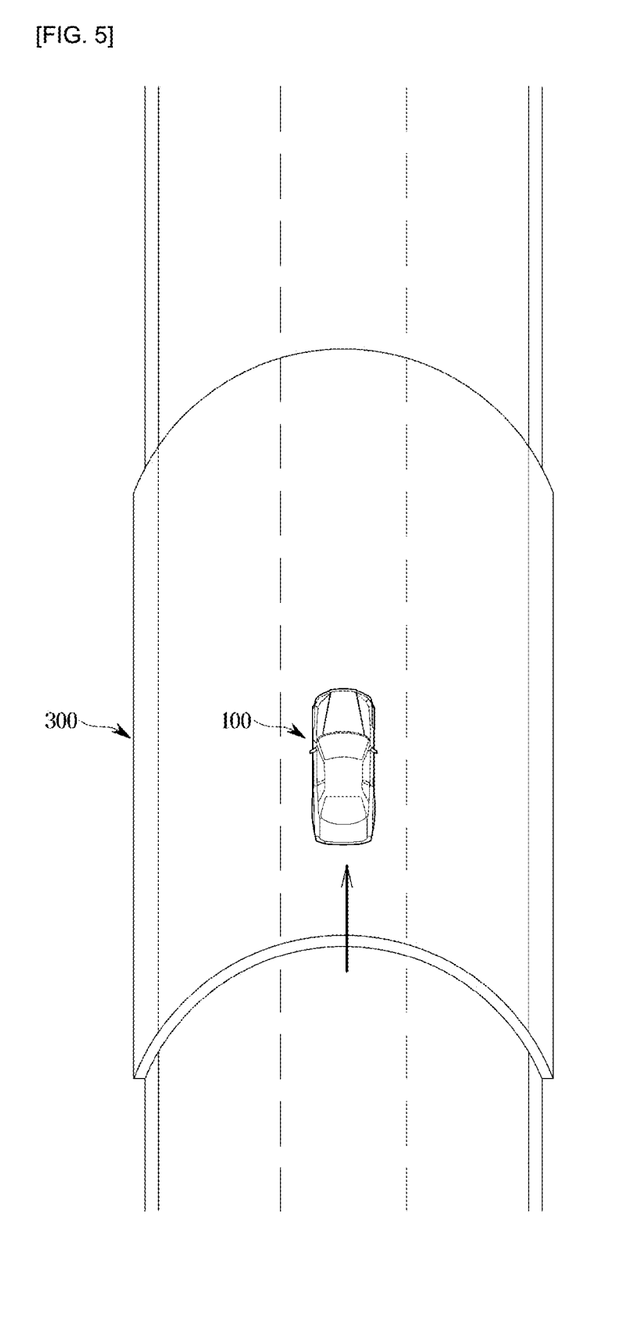
FIG. 5 illustrates a situation in which the vehicle enters a tunnel.
Figure 6:
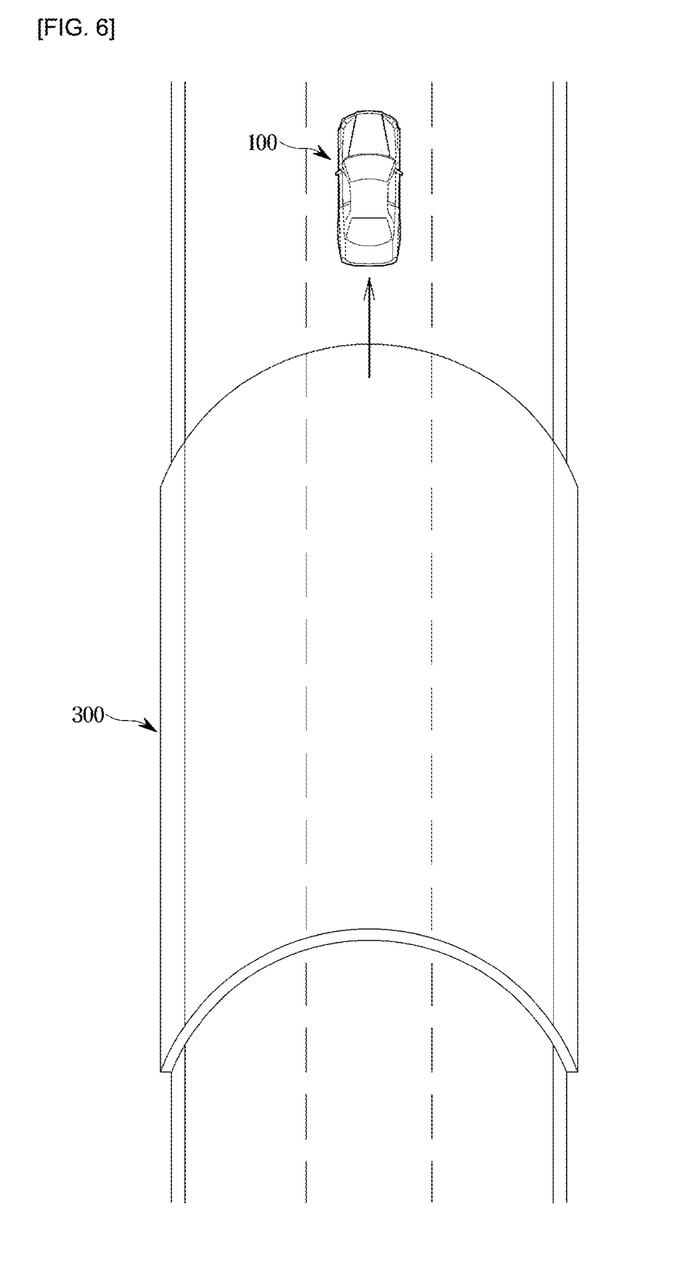
FIG. 6 illustrates a situation in which the vehicle comes out of the tunnel.

FIG. 5 illustrates a situation in which the vehicle enters a tunnel, and FIG. 6 illustrates a situation in which the vehicle comes out of the tunnel.

Referring to FIG. 5, when the vehicle 100 enters a tunnel 300, the controller 150 may exclude the lane information obtained by the camera 110, and may control the vehicle 100 to prevent to deviate from the lane based on the lane information obtained by the lidar sensor 120.

Specifically, the controller 150 may determine whether the vehicle 100 has entered the tunnel 300 based on the location information of the vehicle 100 received by the GPS module 130 and the map information obtained by the communication device 140 from the server 200. At this time, when it is determined that the vehicle 100 has entered the tunnel 300, the controller 150 may exclude the lane information obtained by the camera 110, and may control the vehicle 100 to prevent to deviate from the lane based on the lane information obtained by the lidar sensor 120.

Also, the controller 150 may determine whether the vehicle 100 enters the tunnel 300 based on the image information obtained by the camera 110. For example, when the image information obtained by the camera 110 includes an image of an object recognized as the tunnel 300 or an image of a sign indicating that there is the tunnel 300 in front, the controller 150 may determine that the vehicle 100 has entered the tunnel 300 after a predetermined time elapses.

When it is determined that the vehicle 100 has entered the tunnel 300, the controller 150 may exclude lane information obtained by the camera 110, and may control the vehicle 100 to travel along the center of the lane based on the lane information obtained by the lidar sensor 120.

Referring to FIG. 6, when the vehicle 100 comes out of the tunnel 300, the camera 110 may normally obtain lane information. That is, in this case, it may be appropriate to control the driving of the vehicle 100 using not only the lane information obtained by the lidar sensor 120 but also the lane information obtained by the camera 110.

After determining that the vehicle 100 has entered the tunnel 300, the controller 150 may determine whether the vehicle 100 has come out of the tunnel 300 based on the location information of the vehicle 100 and the map information.

Also, after determining that the vehicle 100 has entered the tunnel 300, the controller 150 may determine whether the vehicle 100 has come out of the tunnel 300 based on the image information obtained by the camera 110.

When it is determined that the vehicle 100 has come out of the tunnel 300, the controller 150 may control the vehicle 100 to prevent to deviate from the lane based on the lane information obtained by the camera 110 and the lidar sensor 120.

At least one component may be added or deleted depending on the performance of the components described above. In addition, it will be readily understood by those of ordinary skill in the art that the mutual positions of the components may be changed depending on the performance or structure of the system.

Figure 7:
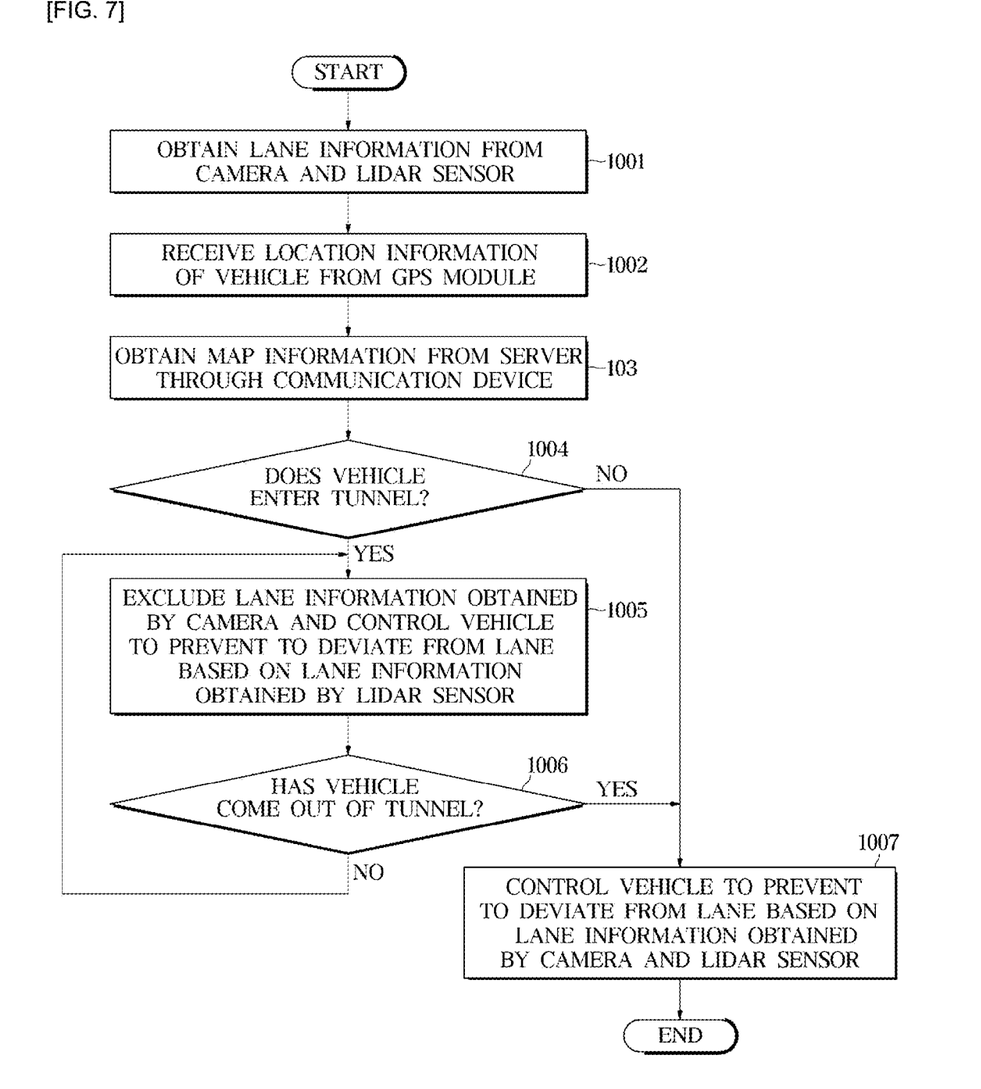
FIG. 7 is a flowchart of a procedure according to an embodiment.

FIG. 7 is a flowchart of a procedure according to an embodiment. This is only a preferred embodiment for achieving the purpose of the disclosure, and some components may be added or deleted as needed.

Referring to FIG. 7, the camera 110 and the lidar sensor 120 may obtain lane information (1001). In this case, the camera 110 and the lidar sensor 120 may transmit the obtained lane information to the controller 150.

The GPS module 130 may receive location information of the vehicle 100 (1002). In this case, the GPS module 130 may transmit the received location information of the vehicle 100 to the controller 150.

The communication device 140 may receive map information at the current location of the vehicle 100 from the server 200 (1003).

The controller 150 may determine whether the vehicle 100 has entered the tunnel 300 (1004).

In this case, the controller 150 may determine whether the vehicle 100 has entered the tunnel 300 based on the location information of the vehicle 100 and the map information. On the other hand, the controller 150 may also determine whether the vehicle 100 enters the tunnel 300 based on the image information obtained by the camera 110.

When the controller 150 determines that the vehicle 100 has not entered the tunnel 300 ('No' in 1004), the controller 150 may control the vehicle 100 to prevent to deviate from the lane based on the lane information obtained by the camera 110 and the lidar sensor 120 (1007).

When the controller 150 determines that the vehicle 100 has entered the tunnel 300 ('YES' in 1004), the controller 150 may exclude the lane information obtained by the camera 110, and may control the vehicle 100 to deviate from the lane based on the lane information obtained by the lidar sensor 120 (1005).

Thereafter, the controller 150 may determine whether the vehicle 100 has come out of the tunnel 300 (1006). In this case, the controller 150 may determine whether the vehicle 100 has come out of the tunnel 300 based on the location information of the vehicle 100 and the map information, and may determine whether the vehicle 100 has come out of the tunnel 300 based on the image information obtained by the camera 110.

When the controller 150 determines that the vehicle 100 has not entered the tunnel 300 ('NO' in 1006), the controller 150 may continuously exclude the lane information obtained by the camera 110, and may control the vehicle 100 to prevent to deviate from the lane based on the lane information obtained by the lidar sensor 120 (1005).

Figure 8:
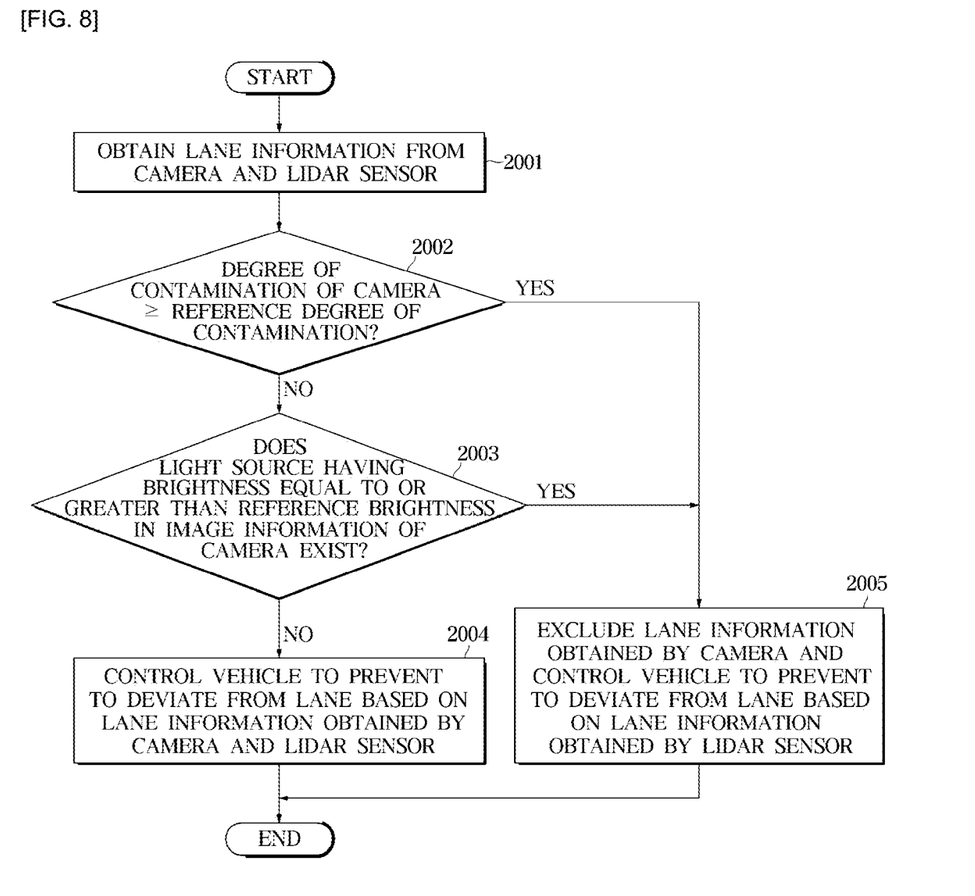
FIG. 8 is a flowchart of a procedure according to another embodiment.

When the controller 150 determines that the vehicle 100 has entered the tunnel 300 ('YES' in 1006), the controller 150 may control the vehicle 100 to prevent to deviate from the lane based on the lane information obtained by the camera 110 and the lidar sensor 120 (1007), FIG. 8 is a flowchart of a procedure according to another embodiment.

Referring to FIG. 8, the camera 110 and the lidar sensor 120 may obtain lane information (2001), In this case, the camera 110 and the lidar sensor 120 may transmit the obtained lane information to the controller 150.

The controller 150 may determine whether the degree of contamination of the camera 110 is equal to or greater than the reference degree of contamination (2002).

When the degree of contamination of the camera 110 is equal to or greater than the reference degree of contamination ('YES' in 2002), the controller 150 may exclude the lane information obtained by the camera 110, and may control the vehicle 100 to prevent to deviate from the lane based on the lane information obtained by the lidar sensor 120 (2005).

When the degree of contamination of the camera 110 is less than the reference degree of contamination ('NO' in 2002), the controller 150 may determine whether a light source having a brightness greater than or equal to the reference brightness in the image information of the camera 110 exists (2003).

When a light source having a brightness greater than or equal to the reference brightness in the image information of the camera 110 exists ('YES' in 2003), the controller 150 may exclude the lane information obtained by the camera 110, and may control the vehicle 100 to prevent to deviate from the lane based on the lane information obtained by the lidar sensor 120 (2005).

When a light source having a brightness greater than or equal to the reference brightness in the image information of the camera 110 does not exist ('NO' in 2003), the controller 150 may control the vehicle 100 to prevent to deviate from the lane based on the lane information obtained by the camera 110 and the lidar sensor 120 (2004).

As is apparent from the above, according to an aspect of the present disclosure, because it is determined whether to also use lane information obtained by a camera or to use only lane information obtained by a lidar sensor depending on whether a vehicle enters a tunnel, whether the camera is contaminated, and whether there is a strong backlight, the performance of a LKA and LFA of the vehicle can be improved.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. An apparatus for assisting driving of a vehicle, the apparatus comprising:
a camera provided in the vehicle and configured to provide camera-obtained lane information by capturing a lane along which the vehicle travels;
a lidar sensor provided in the vehicle and configured to provide lidar-obtained lane information by detecting the lane along which the vehicle travels; and
a controller configured to control steering of the vehicle to prevent to deviate from a lane based on the camera-obtained lane information and the lidar-obtained lane information,
wherein, when the vehicle enters a tunnel, the controller is configured to exclude the camera-obtained lane information and controls the steering of the vehicle to prevent to deviate from the lane based on the lidar-captured lane information.

2. The apparatus according to claim 1, wherein the controller is configured to determine whether the vehicle enters the tunnel based on location information obtained through a GPS module of the vehicle and map information obtained through a communication device of the vehicle.

3. The apparatus according to claim 2, wherein the controller is configured to:
determine whether the vehicle has come out of the tunnel based on the location information of the vehicle and the map information after determining that the vehicle has entered the tunnel, and
control the steering of the vehicle to prevent to deviate from the lane based on the camera-obtained lane information and the lidar-obtained lane information when it is determined that the vehicle has come out of the tunnel.

4. The apparatus according to claim 1, wherein the controller is configured to determine whether the vehicle enters the tunnel based on image information obtained by the camera.

5. The apparatus according to claim 4, wherein the controller is configured to:
determine whether the vehicle has come out of the tunnel based on the image information obtained by the camera after determining that the vehicle has entered the tunnel, and
control the steering of the vehicle to prevent to deviate from the lane based on the camera-obtained lane information and the lidar-obtained lane information when it is determined that the vehicle has come out of the tunnel.

6. The apparatus according to claim 1, wherein the controller is configured to:
control the steering of the vehicle to drive along a center of the lane based on the camera-obtained lane information and the lidar-obtained lane information, and
exclude the camera-obtained lane information and controls the steering of the vehicle to drive along the center of the lane based on the lidar-obtained lane information, when the vehicle enters the tunnel.

7. An apparatus for assisting driving of a vehicle, the apparatus comprising:
a camera provided in the vehicle and configured to provide camera-obtained lane information by capturing a lane along which the vehicle travels;
a lidar sensor provided in the vehicle and configured to provide lidar-obtained lane information by detecting the lane along which the vehicle travels; and
a controller configured to control steering of the vehicle to prevent to deviate from a lane based on the camera-obtained lane information and the lidar-obtained lane information,
wherein the controller is configured to exclude the camera-obtained lane information and controls the steering of the vehicle to prevent to deviate from the lane based on the lidar-obtained lane information, when a degree of contamination of the camera is equal to or greater than a reference degree of contamination
wherein the degree of contamination of the camera indicates a degree to which a surface of the camera is contaminated by contaminant outside the vehicle.

8. The apparatus according to claim 7, wherein the controller is configured to determine the degree of contamination of the camera based on an image output value of the camera and a reference image output value.

9. The apparatus according to claim 7, wherein the controller is configured to exclude the camera-obtained lane information and controls the steering of the vehicle to prevent to deviate from the lane based on the lidar-obtained lane information, when a light source having a brightness equal to or greater than a reference brightness in the image information obtained from the camera exists.

10. The apparatus according to claim 7, wherein the controller is configured to:
control the steering of the vehicle the vehicle to drive along a center of the lane based on the camera-obtained lane information and the lidar-obtained lane information, and
exclude the camera-obtained lane information and controls the steering of the vehicle to drive along the center of the lane based on the lidar-obtained lane information, when the degree of contamination of the camera is equal to or greater than the reference degree of contamination.

11. The apparatus according to claim 10, wherein the controller is configured to exclude the camera-obtained lane information and controls the steering of the vehicle to drive along the center of the lane based on the lidar-obtained lane information, when a light source having a brightness equal to or greater than a reference brightness in the image information obtained from the camera exists.

12. A method for assisting driving of a vehicle, the method comprising:
obtaining and providing, by a camera provided in the vehicle, camera-obtained lane information by capturing a lane along which the vehicle travels;
obtaining and providing, by a lidar sensor provided in the vehicle, lidar-obtained lane information by detecting the lane along which the vehicle travels;
controlling steering of the vehicle to prevent to deviate from a lane based on the camera-obtained lane information and the lidar-obtained lane information; and
excluding the camera-obtained lane information and controlling the steering of the vehicle to prevent to deviate from the lane based on the lidar-obtained lane information, when the vehicle enters a tunnel.

13. The method according to claim 12, further comprising:
receiving location information of the vehicle by a GPS module of the vehicle;
obtaining map information from a server; and
determining whether the vehicle enters the tunnel based on the location information of the vehicle and the map information.

14. The method according to claim 13, further comprising:
- determining whether the vehicle has come out of the tunnel based on the location information of the vehicle and the map information after determining that the vehicle has entered the tunnel; and
- controlling the steering of the vehicle to prevent to deviate from the lane based on the camera-obtained lane information and the lidar-obtained lane information when it is determined that the vehicle has come out of the tunnel.

15. The method according to claim 12, further comprising:
- determining whether the vehicle enters the tunnel based on image information obtained by the camera.

16. The method according to claim 15, further comprising:
- determining whether the vehicle has come out of the tunnel based on the image information obtained by the camera after determining that the vehicle has entered the tunnel; and
- controlling the steering of the vehicle to prevent to deviate from the lane based on the camera-obtained lane information and the lidar-obtained lane information when it is determined that the vehicle has come out of the tunnel.

17. The method according to claim 12, further comprising:
- controlling the steering of the vehicle to drive along a center of the lane based on the camera-obtained lane information and the lidar-obtained lane information, and
- excluding the camera-obtained lane information and controlling the steering of the vehicle to drive along the center of the lane based on the lidar-obtained lane information, when the vehicle enters the tunnel.

18. The method according to claim 12, further comprising:
- excluding the camera-obtained lane information and controlling the steering of the vehicle to prevent to deviate from the lane based on the lidar-obtained lane information, when a degree of contamination of the camera is equal to or greater than a reference degree of contamination,
- wherein the degree of contamination of the camera indicates a degree to which a surface of the camera is contaminated by contaminant outside the vehicle.

19. The method according to claim 12, further comprising:
- controlling the steering of the vehicle to drive along a center of the lane based on the camera-obtained lane information and the lidar-obtained lane information, and
- excluding the camera-obtained lane information and controlling the steering of the vehicle to drive along a center of the lane based on the lidar-obtained lane information, when a degree of contamination of the camera is equal to or greater than a reference degree of contamination,
- wherein the degree of contamination of the camera indicates a degree to which a surface of the camera is contaminated by contaminant outside the vehicle.

20. The method according to claim 12, further comprising:
- excluding the camera-obtained lane information and controlling the steering of the vehicle to prevent to deviate from the lane based on the lidar-obtained lane information, when a light source having a brightness equal to or greater than a reference brightness in the image information obtained from the camera exists.

21. The apparatus for assisting driving of a vehicle of claim 1,
- wherein the controller controls the steering of the vehicle to prevent to deviate from a lane by adjusting a lateral distance from the vehicle to the lane based on the camera-obtained lane information and the lidar-obtained lane information.

22. The apparatus for assisting driving of a vehicle of claim 7,
- wherein the contaminant is a tangible substance material which is attached to and covers an outside surface of the camera.

23. The apparatus for assisting driving of a vehicle of claim 22,
- wherein the tangible substance material which is attached to and covers an outside surface of the camera includes at least one from among a group consisting of rainwater causing distortion of camera-obtained images, snow, a plastic bag, and a dead leaf.

* * * * *